(12) United States Patent
Muehsam

(10) Patent No.: US 6,608,400 B1
(45) Date of Patent: Aug. 19, 2003

(54) METHOD AND CONFIGURATION FOR EFFECTING AN INTERRUPTION-FREE POWER SUPPLY OPERATION OF A SYSTEM UNIT

(75) Inventor: Gerhard Muehsam, Koenigsbrunn (DE)

(73) Assignee: Fujitsu Siemens Computers GmbH, München (DE)

( * ) Notice: Subject to any disclaimer, the term of this patent is extended or adjusted under 35 U.S.C. 154(b) by 0 days.

(21) Appl. No.: 09/762,622

(22) PCT Filed: Apr. 23, 1999

(86) PCT No.: PCT/DE99/01225
§ 371 (c)(1),
(2), (4) Date: Jul. 6, 2001

(87) PCT Pub. No.: WO99/56375
PCT Pub. Date: Nov. 4, 1999

(30) Foreign Application Priority Data

Apr. 28, 1998 (DE) .......................... 198 18 986

(51) Int. Cl.⁷ .................................. H02J 1/10

(52) U.S. Cl. ............................ 307/23; 307/29; 307/43; 307/65; 307/80; 307/125

(58) Field of Search ............................ 307/23, 29, 43, 307/65, 80, 125

(56) References Cited

U.S. PATENT DOCUMENTS

| | | | |
|---|---|---|---|
| 4,659,942 A | | 4/1987 | Volp |
| 4,761,563 A | * | 8/1988 | Ross et al. .................... 307/87 |
| 5,602,805 A | | 2/1997 | Chigita |
| 6,018,203 A | * | 1/2000 | David et al. .................. 307/52 |
| 6,048,044 A | * | 4/2000 | Biggel et al. ............... 312/258 |

FOREIGN PATENT DOCUMENTS

| | | |
|---|---|---|
| DE | 44 17 924 | 12/1994 |
| WO | WO 97/14206 | 4/1997 |
| WO | WO 97/21267 | 6/1997 |

OTHER PUBLICATIONS

IBM Technical Disclosure Bulletin, vol. 30, No. 8, (1988), Power Control by Hosts to Shared Devices such as Direct Access Storage Devices, pp. 430–432.
"Interruption–Free Power Supplies", in Funkschau 25 (96), Summary, p. 46–49.
Voltage with and without mains, No. 16, (1990), pp. 40–42.
http://ns.prosek.cz/ups/emas soft.html, in englischer Sprache auf der Seite, http://www.masterguary.de/asi/8/dmas soft.h tml bekannt. Die tschechische Seite ist laut der Ergebnisseite von AltqaVista™ nach einer in allen Sprachen gehaltenen Internetsuche nach dem Stichwort "PowerProtect NET", Punk1 zuletzt am 23.9 1997 geandert worden. Marketed by Masterguard: http://www.masterguard.de/page/eng/1340/index.cfm, Nov. 22, 2000, pp. 1 to 4.

* cited by examiner

Primary Examiner—Brian Sircus
Assistant Examiner—Robert L. DeBeradinis
(74) Attorney, Agent, or Firm—Schiff Hardin & Waite

(57) ABSTRACT

For accomplishing an interruption-free power supply operation of a system unit (HDD) in a computer system with a plurality of system computers (Sa; Sb) sharing the system unit (HDD) without having the limitation to a local location, a method and an arrangement is [sic] proposed in accord wherewith the operation of the respective station computers (Sa; Sb) respectively ensues with their own interruption-free power supplies (USVa; USVb) and, for the power supply of the shared system unit (HDD), the shared system unit (HDD) is always connected to an active interruption-free power supply (for example, USVb) by an automatically switching switchover (PCS) that monitors the voltage of its inputs.

7 Claims, 1 Drawing Sheet

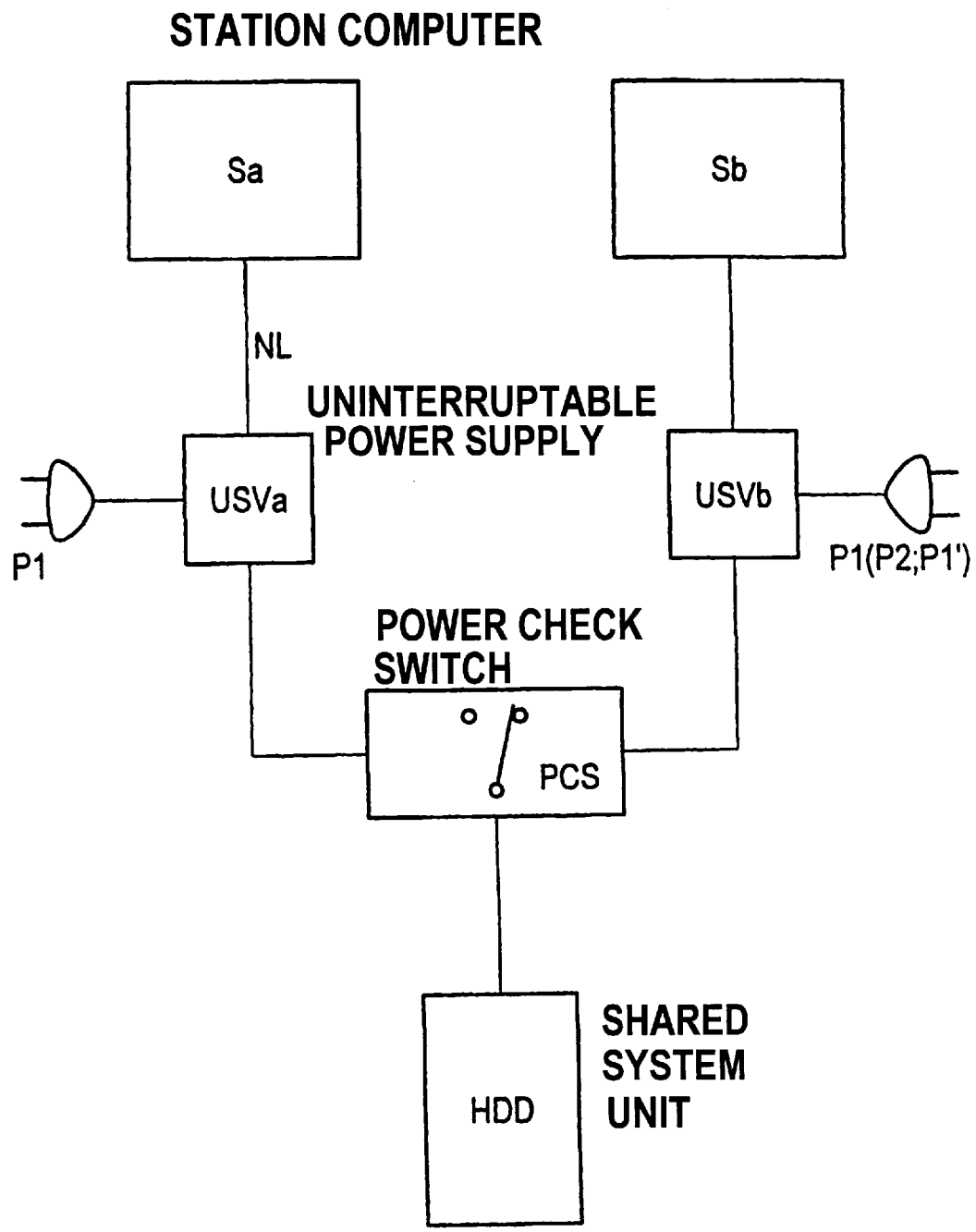
FIG.

METHOD AND CONFIGURATION FOR EFFECTING AN INTERRUPTION-FREE POWER SUPPLY OPERATION OF A SYSTEM UNIT

The invention is directed to a method and to an arrangement for accomplishing an interruption-free power supply operation of a system unit according to the preamble of claim 1 or, respectively, 5.

Clusters are computer systems with a plurality of station computers, what are referred to as servers, that use what is referred to as a "shared peripheral cabinet" in common. A "shared peripheral cabinet" is a system unit that is formed by a system memory component. For example, a disk storage system is such a component.

The components of such clusters can be placed at different locations.

The clusters must be protected against power outage. It is known to connects all devices, i.e. all servers and the "shared peripheral cabinet", to a single, very large, interruption-free power supply.

A corresponding example is known from the Internet in the Czech language on the page http://ns.prosek.cz/ups/emas_soft.html, in English on the page http://www.masterguard.de/asi/8/emas_soft.html and in German on the page http://www.masterguard.de/asi/8/dmas_soft.html. According to the result page of AltaVista™ following an Internet search in all languages for the key word "PowerProtect NET", Point 1, the Czech was most recently updated on Sep. 23, 1997.

It is disadvantageous that a location dependency is established since all components are to be connected to the large, interruption-free power supply. Another disadvantage is that, given outage of the one, large interruption-free power supply, the entire cluster immediately becomes non-functioning. In particular, the commonly used memory component is without a supply current, which can lead to irretrievable data losses. Moreover, an appropriately large, interruption-free power supply is not always commercially available, so that expensive customized systems are needed.

In addition to this Prior Art, IBM Technical Disclosure Bulletin, January 1988, pages 430 through 432, discloses a switch unit that enables a monitoring of the power supply in systems wherein, for example, a plurality of computer units collaborate with a memory component used in common. The individual system components thereby respectively have their own power supply and are respectively connected to the switch unit. By actuating different switches, the switch unit makes it possible to initiate the shut-off of all or individual system component power supplies, whether because there is an emergency are because service work is due to be performed at an individual system component. The disconnect of the power supply is undertaken by the respective, appertaining system component itself. As long as only computer units are affected by shut-offs of the power supply, the other computer units that are still respectively present can collaborate with the shared memory component. What is disadvantageous is that, as mentioned above, each system component has its own power supply and is dependent on the functioning thereof.

Generally interruption-free power supplies are known from the publications Funkschau, 25/96, pages 46 through 49 and eee, No. 16, August 1990, pages 40 through 42.

An object of the present invention is to specify a method and an arrangement for accomplishing an interruption-free power supply operation of a system unit, particularly of a memory component in a computer system of the species initially cited that tolerates errors and can be realized without local linking.

This object is achieved for the method with the method steps according to the characterizing part of claim 1. For the arrangement, the object is achieved according to the features of claim 5.

An interruption-free power supply operation of a system unit in a computer system with a plurality of station computers using the system unit in common that tolerates errors and can be realized without local linking can be realized both with the method as well as with the arrangement.

The independence from local linking and the error tolerance are accomplished in that each station computer is connected on site to its own interruption-free power supply or, respectively, is supplied with power by such a power supply, and that the shared system unit, i.e. the memory component, is connected to respectively one of the active, interruption-free power supplies via a voltage-monitoring, automatic switchover means. In this way, first, an interruption-free power supply of a station computer can fail (network outage/malfunction/service call) and the shared system unit is nonetheless supplied with power. Since each station unit has its own interruption-free power supply, these can also be placed at different locations. The locations, moreover, can lie apart from one another.

Another advantage of the decentralized power supply is that the respective interruption-free power supplies—since they need not be selected that large—can be in a power class that is commercially available. A voltage-monitoring switchover is likewise commercially available and functions without specific interruption-free power supply monitoring software for multi-server applications. The shared system unit is always supplied with the voltage of an active, interruption-free power supply via the voltage-monitoring, automatic switchover that monitors the input voltages.

Advantageous developments of the invention are the subject matter of subclaims.

With respect to the method, the individual, interruption-free power supplies can be supplied with power via a respectively same phase. A local linking is thereby not established. The computer system remains tolerant of errors as long as an interruption-free power supply and not the supply phase fails. The advantage is that the computer system can be operated when only one phase is available.

When a plurality of phases are available, the individual, interruption-free power supplies can be supplied with power from the various phases. This has the additional advantage that an individual phase can also go down without the entire computer system or, respectively, the shared system component being thereby negatively affected.

A similar effect is achieved when the various interruption-free power supplies are in fact operated not with different phases but with a respectively independently protected identical phase. It is in fact possible that the respectively same phase is present at different locations. But that they are separately protected because they derive from a respectively different feed. I.e., when the phase goes down at one location, it can still be present at the other locations.

The phase redundancy enhances the security and availability of the computer system.

An exemplary embodiment of the invention is explained in greater detail below on the basis of a drawing.

The single FIGURE shows a computer system with two station computers Sa and Sb that are connected to respective supply phases via respective, interruption-free power supplies USVa and USVb. In the exemplary embodiment, the one phase P1 is both for the one interruption-free power supply USVa as well as for the other interruption-free power supply USVb.

However, as indicated, for example, for the interruption-free power supply USVb in the FIGURE, the interruption-free power supplies could also be connected to different phases, for example P1 and P2, or to identical but differently protected phases P1 and P1'.

All interruption-free power supplies USVa, USVb are connected to input terminals of an automatic switchover PCS (power-check switch) that monitors the voltage of the input terminals. The system unit HDD used in common by the respective station computers Sa, Sb, a memory component, for example a disk storage, in the present case, is connected to an output terminal of the switchover PCS.

The connection between the individual components is accomplished by network lines NL.

The voltage-monitoring switchover PCS monitors the voltages adjacent at the input terminals. When the voltage at the input terminal fails, this voltage being connected at the moment to the output terminal by the switchover PCS, the switchover automatically switches to an input terminal at which a voltage is adjacent. In this way, the shared system unit HDD is always supplied with voltage without a separate interruption-free power supply being required for this purpose.

What is claimed is:

1. A method for providing an uninterruptible power supply operation of a shared system unit in a computer system with a plurality of station computers using said shared system unit in common, comprising the steps of:

providing station computers with their own uninterruptible power supplies; and co-connecting and maintaining said shared system unit to an active uninterruptible power supply which is one of the station computer uninterruptable power supplies by an automatically switching voltage-monitoring unit.

2. The method according to claim 1, further comprising the step of supplying different uninterruptible power supplies with identical phases.

3. The method according to claim 1, further comprising the step of supplying different uninterruptible power supplies with different phases.

4. The method according to claim 1, further comprising the step of supplying different uninterruptible power supplies with identical but separately protected phases.

5. An arrangement for providing an uninterruptible power supply operation in a computer system, said arrangement comprising:

a system unit;

a plurality of station computers using said system unit in common;

a plurality of uninterruptible power supplies, each of which is separately respectively connected to each said station computer; and a switchover unit having a plurality of input terminals and an output terminal, each of said input terminals being connected to said uninterruptible power supplies, said switchover unit monitoring a voltage at said input terminals, and automatically switching to a voltage-carrying input terminal and thereby connects said voltage-carrying input terminal to said output terminal which is connected to said shared system unit.

6. The arrangement according to claim 5, wherein said station computers are servers and said shared system unit is a system memory component.

7. The arrangement according to claim 6, wherein said system memory component is a disk storage system.

* * * * *